Aug. 19, 1924.

B. G. McNEIL 1,505,271

BICYCLE

Filed Sept. 24, 1923     2 Sheets Sheet 1

Inventor
Bartley G. McNeil

By Herbert E. Smith

Attorney

Aug. 19, 1924.  
B. G. McNEIL  
BICYCLE  
Filed Sept. 24, 1923    2 Sheets-Sheet 2  
1,505,271
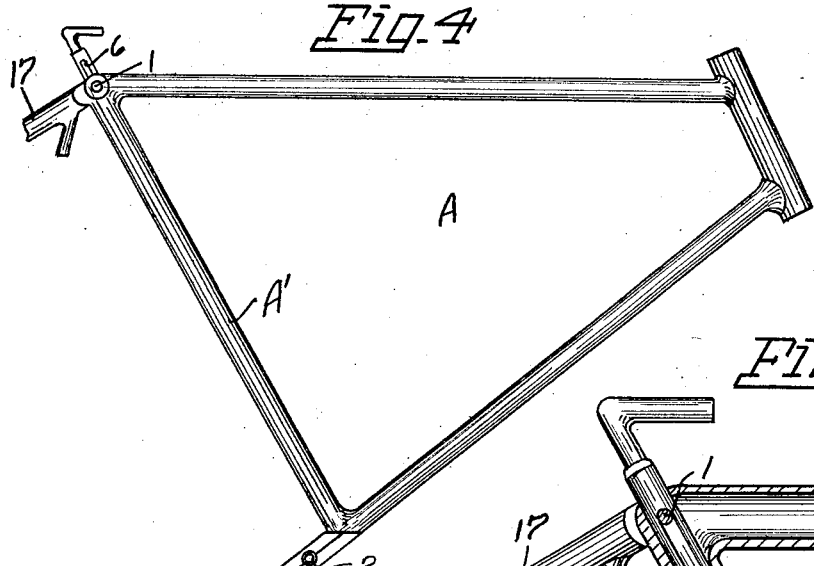
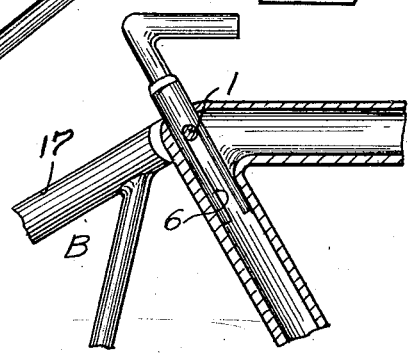
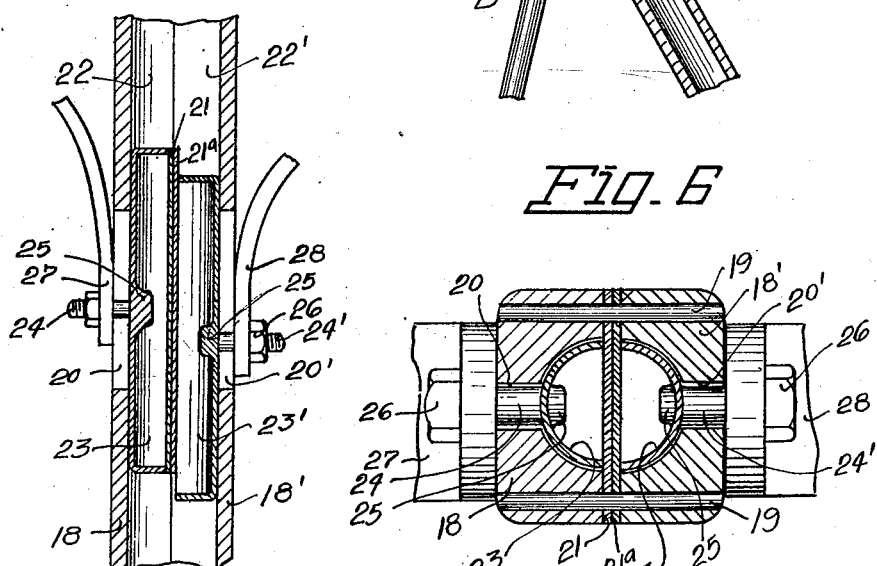
Inventor  
Bartley G. McNeil
Attorney Patented Aug. 19, 1924.

1,505,271

UNITED STATES PATENT OFFICE.

BARTLEY G. McNEIL, OF CRANBROOK, BRITISH COLUMBIA, CANADA.

BICYCLE.

Application filed September 24, 1923. Serial No. 664,471.

*To all whom it may concern:*

Be it known that I, BARTLEY G. McNEIL, a citizen of the Dominion of Canada, and subject of the King of Great Britain, residing at Cranbrook, Province of British Columbia, Canada, have invented certain new and useful Improvements in Bicycles, of which the following is a specification.

The present invention relates to improvements in bicycles of the type employing a propulsion mechanism embodying a lever and crank motion in connection with a driving sprocket device. The primary object of the invention is the provision of means in connection with the propulsion mechanism for insuring a smooth and freely reciprocating slide bearing for the propelling levers of the bicycle. The levers are pivotally connected to the crank shaft and the power developed through the levers is applied with efficiency and facility.

The invention consists in certain novel features of construction and combinations and arrangements of parts as will hereinafter be more fully described and claimed.

In the accompanying drawings I have illustrated one complete example of the physical embodiment of the invention wherein the parts are combined and arranged according to the best mode thus far devised for the practical application of the principles of the invention.

While the drawings show one exemplification of the invention employing a diamond frame of particular construction and one adaptation of the leverage device for propelling the bicycle, it will be understood that the invention is applicable for use in other analogous vehicles.

Figure 4 is a view in side elevation of the front section of the diamond frame.

Figure 5 is an enlarged detail sectional view showing the seat supporting structure.

Figure 6 is an enlarged transverse sectional view at the rear of the bicycle frame showing the sliding bearings for the propulsion levers.

Figure 7 is a longitudinal sectional view showing the sliding bearings for the propulsion levers.

Figure 1:
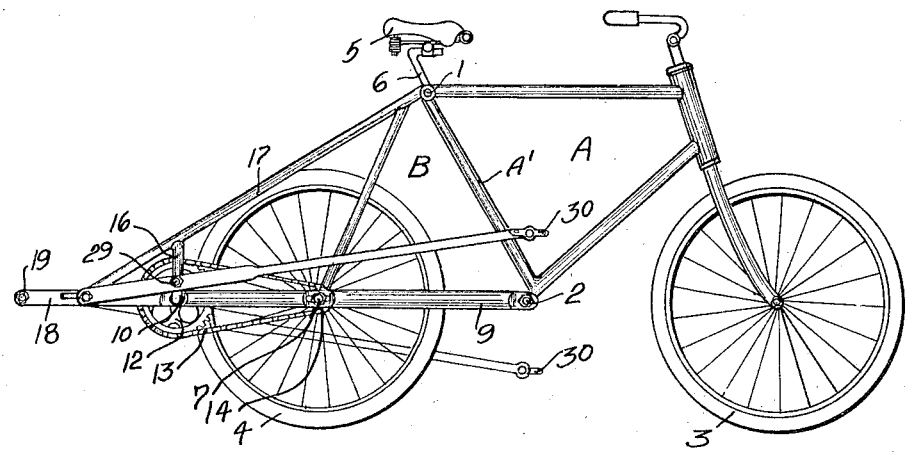
Figure 1 is a view in side elevation of a bicycle embodying the invention.
Figure 2:
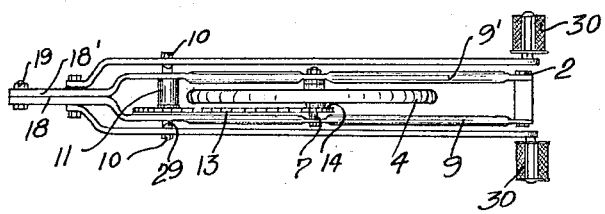
Figure 2 is a top plan view showing the rear frame section and the propulsion mechanism in connection with the driving wheel of the bicycle.
Figure 3:
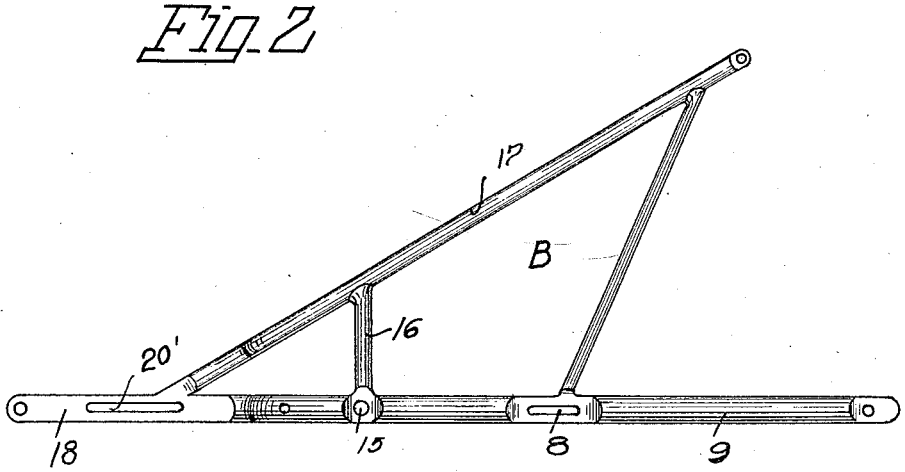
Figure 3 is an enlarged view in side elevation of the rear section of the diamond frame.

As illustrated in the drawings the diamond shape frame is employed in carrying out the invention, which frame comprises the front section A and the rear section B, the two sections being coupled together by the main transverse bolts 1 and 2 to form the diamond frame. The front steering wheel 3 and the rear driving wheel 4 are of standard type, and the seat 5 is supported on the forked seat post 6 in connection with the main bolt 1, the forked post extending downwardly in the intermediate bar A' of the frame.

The driving axle 7 of the wheel 4 is supported at the slot 8 of each of the rear horizontal frame bars 9 and 9' which are arranged in parallelism at the sides of the driving wheel, and suitable fastening devices are employed for retaining the axle 7 in operative position.

The driving axle and wheel are operated from the transversely arranged crank shaft 10 located at the rear of the axle 7 and of course parallel therewith. By means of the driving sprocket 12 on the crank shaft, sprocket chain 13, and the driven sprocket 14 on the axle 7, the motion of the crank shaft is imparted to the axle 7 and its driving wheel.

The separable rear frame section B which is supported by the driving wheel, supports the crank shaft through the two lower horizontal bars 9 and 9', these bars being provided with bearings 15 for the shaft, and the frame section is braced as by short bars 16 which connect the lower horizontal bars 9 and 9' with the pair of rearwardly extending bars 17 of the rear frame section. The bars 9 9' are spaced apart to accommodate the driving wheel 4 and the sprocket mechanism, but at the rear of the frame they are bent and brought together to form an extension fashioned with the two members 18 and 18' to which members the bars 17 are also connected. The extension members are securely held together by bolts as 19 and they are provided with longitudinally extending complementary slots 20 20' arranged transversely of the extension members. Between the two members 18 18' are arranged a pair of vertically disposed wear plates or packing strips 21 21ª which are securely fastened between the extension members by the bolts 19.

The two extension members which are rigidly joined together, are each provided with a longitudinally extending groove as 22 and 22', semi-circular in cross section and fashioned in the inner adjacent faces of the extension members, the two wear plates 21 21ª forming closures for these grooves intermediate of the rigid extension structure. These grooves are utilized as guideways for the complementary slide heads 23 23'. These heads as will be seen in Figures 6 and 7 are tubular structures of considerable length and semi-circular in cross section adapting them to the contour of the guide ways provided therefor, and the heads are adapted to reciprocate in the guide ways longitudinally of the extension members.

Each slidable bearing head is equipped with a laterally extending bolt as 24 24' which projects through the slot 20 or 20' in the extension members, and the bolts are secured to the slide heads by means of bosses as 25. At their free ends the bolts are provided with retaining nuts 26 which secure the rear ends of the propelling levers 27 and 28 on their respective bolts, the lever ends of course being pivoted on the bolts as fulcrums therefor.

The levers are bent outwardly from their pivot points and then extend forward of the bicycle parallel with and outside of the frame bars 9 9' and at 29 each lever has a bearing on the crank shaft 10. The front free ends of the levers are each provided with a pedal as 30 located in position to be operated by the foot of the rider, and the levers and crank shaft are arranged as usual in such manner that the power strokes of the levers are alternately applied.

It will be apparent that by depressing the pedal it will be swung on its pivot bolt to impart a working stroke which is conveyed through the crank shaft to the propulsion mechanism for driving the bicycle. Due to the crank motion of the propulsion mechanism the pivot point of the lever is made to reciprocate and the reciprocal motion of the pivot bolt is provided for by the slide heads 23 23' that reciprocate or slide backward and forward in their guide ways. The slide bearings for these heads are of considerable length and they are well lubricated to insure a smooth and stable motion with a freedom of action to reduce friction. The bolts 24 24' reciprocate in their guide slots 20 20' as the slide heads move back and forth in their guide ways, and the wear of the moving parts may be taken up by the movement of the bolts in their slots as well as by the slide heads in their guideways.

The leverage of the two levers may be varied if desired; and the sprocket mechanism may be adjusted by positioning the axle 7 in the slots 8 of the lower bars 9 9'. As thus constructed it will be apparent that an effective power may readily be developed and transmitted to the driving wheel 4 for propelling the bicycle or other vehicle of similar character, and as the operating parts constitute a minimum number of elements, the bicycle may be manufactured at comparatively low cost of production.

Having thus fully described the invention, what is claimed as new is—

1. The combination with a bicycle frame and the crank axle journaled therein, of a rear extension on the frame having lateral slots and interior guide ways, a tubular slide head in each guide way semi-circular in cross section and a laterally extending bolt on each slide head movable in one of said slots, a lever pivoted on each bolt, a journal bearing for each lever on the crank axle, and pedals on the free ends of said levers.

2. The combination with a pair of spaced frame bars and a crank axle journaled therein, of rear extensions on said bars and means for securing them together, said extensions each having a lateral slot and an inner groove, wear plates secured between the grooved extensions, a slide head in each groove having a laterally extending bolt movable in one of said slots, a lever pivoted on each bolt, a journal bearing for each lever on the crank axle, and operating pedals on the free ends of said levers.

In testimony whereof I affix my signature.

BARTLEY G. McNEIL.